(12) United States Patent
Lightner et al.

(10) Patent No.: US 9,690,814 B2
(45) Date of Patent: Jun. 27, 2017

(54) METHOD FOR FACET SEARCHING AND SEARCH SUGGESTIONS

(71) Applicant: QBASE, LLC, Reston, VA (US)

(72) Inventors: Scott Lightner, Leesburg, VA (US); Franz Weckesser, Spring Valley, OH (US)

(73) Assignee: QBase LLC, Reston, VA (US)

( * ) Notice: Subject to any disclaimer, the term of this patent is extended or adjusted under 35 U.S.C. 154(b) by 0 days.

(21) Appl. No.: 14/965,595

(22) Filed: Dec. 10, 2015

(65) Prior Publication Data
US 2016/0098433 A1    Apr. 7, 2016

Related U.S. Application Data

(63) Continuation of application No. 14/557,807, filed on Dec. 2, 2014, now Pat. No. 9,424,294.

(60) Provisional application No. 61/910,834, filed on Dec. 2, 2013.

(51) Int. Cl.
*G06F 17/30* (2006.01)

(52) U.S. Cl.
CPC .... *G06F 17/30321* (2013.01); *G06F 17/3053* (2013.01); *G06F 17/3097* (2013.01); *G06F 17/30477* (2013.01); *G06F 17/30542* (2013.01); *G06F 17/30979* (2013.01); *G06F 17/30991* (2013.01)

(58) Field of Classification Search
CPC ........... G06F 17/30321; G06F 17/3053; G06F 17/30477; G06F 17/30991; G06F 17/30979; G06F 17/3097; G06F 17/30542
See application file for complete search history.

(56) References Cited

U.S. PATENT DOCUMENTS

| | | | |
|---|---|---|---|
| 6,128,660 A | 10/2000 | Grimm et al. |
| 6,178,529 B1 | 1/2001 | Short et al. |
| 6,266,781 B1 | 7/2001 | Chung et al. |
| 6,353,926 B1 | 3/2002 | Parthesarathy et al. |
| 6,457,026 B1 | 9/2002 | Graham et al. |
| 6,738,759 B1 | 5/2004 | Wheeler et al. |
| 6,832,373 B2 | 12/2004 | O'Neill |
| 6,832,737 B2 | 12/2004 | Karlsson et al. |

(Continued)

FOREIGN PATENT DOCUMENTS

| | | |
|---|---|---|
| WO | 2013/003770 A2 | 1/2013 |
| WO | 2015099961 A1 | 7/2015 |

OTHER PUBLICATIONS

International Search Report and Written Opinion dated Feb. 24, 2015 corresponding to International Patent Application No. PCT/US2014/067918, 10 pages.

(Continued)

*Primary Examiner* — Albert Phillips, III
(74) *Attorney, Agent, or Firm* — Eric L. Sophir; Dentons US LLP

(57) ABSTRACT

Methods for faceted searching within clustered in-memory databases are disclosed. Faceted searching may be used to generate search suggestions. The faceted search engine may be able to use non-literal key algorithms for a partial prefix fuzzy matching and may include a feature disambiguation module. The disclosed search engine may be capable of processing large amounts of unstructured data in real time to generate search suggestions.

16 Claims, 3 Drawing Sheets

(56) References Cited

U.S. PATENT DOCUMENTS

| | | |
|---|---|---|
| 7,058,846 B1 | 6/2006 | Kelkar et al. |
| 7,370,323 B2 | 5/2008 | Marinelli et al. |
| 7,421,478 B1 | 9/2008 | Muchow |
| 7,447,940 B2 | 11/2008 | Peddada |
| 7,543,174 B1 | 6/2009 | van Rietschote et al. |
| 7,681,075 B2 | 3/2010 | Havemose et al. |
| 7,818,615 B2 | 10/2010 | Krajewski et al. |
| 7,899,871 B1 | 3/2011 | Kumar et al. |
| 8,055,933 B2 | 11/2011 | Jaehde et al. |
| 8,122,026 B1 | 2/2012 | Laroco et al. |
| 8,332,258 B1 | 12/2012 | Shaw |
| 8,341,622 B1 | 12/2012 | Eatough |
| 8,345,998 B2 | 1/2013 | Malik et al. |
| 8,356,036 B2 | 1/2013 | Bechtel et al. |
| 8,375,073 B1 | 2/2013 | Jain |
| 8,423,522 B2 | 4/2013 | Lang et al. |
| 8,429,256 B2 | 4/2013 | Vidal et al. |
| 8,726,267 B2 | 5/2014 | Li et al. |
| 8,782,018 B2 | 7/2014 | Shim et al. |
| 8,948,736 B2 | 2/2015 | Bournelle et al. |
| 8,995,717 B2 | 3/2015 | Cheng et al. |
| 9,009,153 B2 | 4/2015 | Khan et al. |
| 9,025,892 B1 | 5/2015 | Lightner et al. |
| 9,032,387 B1 | 5/2015 | Hill et al. |
| 9,087,005 B2 | 7/2015 | Chen et al. |
| 9,201,744 B2 | 12/2015 | Lightner et al. |
| 2001/0037398 A1 | 11/2001 | Chao et al. |
| 2002/0165847 A1 | 11/2002 | McCartney et al. |
| 2002/0174138 A1 | 11/2002 | Nakamura et al. |
| 2003/0028869 A1 | 2/2003 | Drake et al. |
| 2003/0112792 A1 | 6/2003 | Cranor et al. |
| 2003/0158839 A1 | 8/2003 | Faybishenko et al. |
| 2003/0182282 A1 | 9/2003 | Ripley |
| 2004/0010502 A1 | 1/2004 | Bomfim et al. |
| 2004/0027349 A1 | 2/2004 | Landau et al. |
| 2004/0049478 A1 | 3/2004 | Jasper |
| 2004/0143571 A1 | 7/2004 | Bjornson et al. |
| 2004/0153869 A1 | 8/2004 | Marinelli et al. |
| 2004/0205064 A1 | 10/2004 | Zhou et al. |
| 2004/0215755 A1 | 10/2004 | O'Neill |
| 2005/0192994 A1 | 9/2005 | Caldwell et al. |
| 2006/0101081 A1 | 5/2006 | Lin et al. |
| 2006/0294071 A1 | 12/2006 | Weare et al. |
| 2007/0005639 A1 | 1/2007 | Gaussier et al. |
| 2007/0073708 A1 | 3/2007 | Smith et al. |
| 2007/0203693 A1 | 8/2007 | Estes |
| 2007/0203924 A1 | 8/2007 | Guha et al. |
| 2007/0240152 A1 | 10/2007 | Li et al. |
| 2007/0250519 A1 | 10/2007 | Fineberg et al. |
| 2007/0282959 A1 | 12/2007 | Stern |
| 2008/0010683 A1 | 1/2008 | Baddour et al. |
| 2008/0027920 A1 | 1/2008 | Schipunov et al. |
| 2009/0019013 A1 | 1/2009 | Tareen et al. |
| 2009/0043792 A1 | 2/2009 | Barsness et al. |
| 2009/0049038 A1 | 2/2009 | Gross |
| 2009/0089626 A1 | 4/2009 | Gotch et al. |
| 2009/0094484 A1 | 4/2009 | Son et al. |
| 2009/0144609 A1 | 6/2009 | Liang et al. |
| 2009/0216734 A1 | 8/2009 | Aghajanyan et al. |
| 2009/0240682 A1 | 9/2009 | Balmin et al. |
| 2009/0292660 A1 | 11/2009 | Behal et al. |
| 2009/0299999 A1 | 12/2009 | Loui et al. |
| 2009/0322756 A1 | 12/2009 | Robertson et al. |
| 2010/0077001 A1 | 3/2010 | Vogel et al. |
| 2010/0138931 A1 | 6/2010 | Thorley et al. |
| 2010/0223264 A1 | 9/2010 | Bruckner et al. |
| 2010/0235311 A1 | 9/2010 | Cao et al. |
| 2010/0274785 A1 | 10/2010 | Procopiuc et al. |
| 2011/0071975 A1 | 3/2011 | Friedlander et al. |
| 2011/0093471 A1 | 4/2011 | Brockway et al. |
| 2011/0119243 A1* | 5/2011 | Diamond ......... G06F 17/30867 707/706 |
| 2011/0282888 A1 | 11/2011 | Koperski et al. |
| 2011/0296390 A1 | 12/2011 | Vidal et al. |
| 2011/0296397 A1 | 12/2011 | Vidal et al. |
| 2012/0030220 A1 | 2/2012 | Edwards et al. |
| 2012/0059839 A1 | 3/2012 | Andrade et al. |
| 2012/0102121 A1 | 4/2012 | Wu et al. |
| 2012/0117069 A1 | 5/2012 | Kawanishi et al. |
| 2012/0131139 A1 | 5/2012 | Siripurapu et al. |
| 2012/0246154 A1 | 9/2012 | Duan et al. |
| 2012/0310934 A1 | 12/2012 | Peh et al. |
| 2012/0323839 A1 | 12/2012 | Kiciman et al. |
| 2013/0132405 A1 | 5/2013 | Bestgen et al. |
| 2013/0166480 A1 | 6/2013 | Popescu et al. |
| 2013/0166547 A1* | 6/2013 | Pasumarthi ............ G06Q 10/06 707/728 |
| 2013/0290232 A1 | 10/2013 | Tsytsarau et al. |
| 2013/0303198 A1 | 11/2013 | Sadasivam et al. |
| 2013/0325660 A1 | 12/2013 | Callaway |
| 2013/0326325 A1 | 12/2013 | De et al. |
| 2014/0013233 A1 | 1/2014 | Ahlberg et al. |
| 2014/0022100 A1 | 1/2014 | Fallon et al. |
| 2014/0089237 A1 | 3/2014 | Adibi |
| 2014/0156634 A1* | 6/2014 | Buchmann ........ G06F 17/30572 707/714 |
| 2014/0244550 A1 | 8/2014 | Jin et al. |
| 2014/0255003 A1 | 9/2014 | Abramson et al. |
| 2014/0280183 A1 | 9/2014 | Brown et al. |
| 2014/0351233 A1 | 11/2014 | Crupi et al. |
| 2015/0074037 A1 | 3/2015 | Sarferaz |
| 2015/0154079 A1 | 6/2015 | Lightner et al. |
| 2015/0154194 A1 | 6/2015 | Lightner et al. |
| 2015/0154200 A1 | 6/2015 | Lightner et al. |
| 2015/0154264 A1 | 6/2015 | Lightner et al. |
| 2015/0154283 A1 | 6/2015 | Lightner et al. |
| 2015/0154286 A1 | 6/2015 | Lightner et al. |
| 2015/0154297 A1 | 6/2015 | Lightner et al. |

OTHER PUBLICATIONS

International Search Report and Written Opinion of the International Searching Authority dated Apr. 15, 2015 corresponding to International Patent Application No. PCT/US2014/068002, 10 pages.

International Search Report and Written Opinion of the International Searching Authority dated Apr. 15, 2015, corresponding to International Patent Application No. PCT/2014/067994, 9 pages.

Tunkelang, D., "Faceted Search," Morgan & Claypool Publ., 2009, pp. i-79.

Schuth, A., et al., "University of Amsterdam Data Centric Ad Hoc and Faceted Search Runs," ISLA, 2012, pp. 155-160.

Tools, Search Query Suggestions using ElasticSearch via Shingle Filter and Facets, Nov. 2012, pp. 1-12.

Wang, et al., "Automatic Online News Issue Construction in Web Environment," WWW 2008/Refereed Track: Search—Applications, Apr. 21-25, 2008—Beijing, China, pp. 457-466.

International Search Report and Written Opinion dated Mar. 6, 2015 corresponding to International Patent Application No. PCT/US2014/067993, 9 pages.

International Search Report and Written Opinion dated Mar. 10, 2015 corresponding to International Patent Application No. PCT/US2014/067999, 10 pages.

International Search Report and Written Opinion of the International Searching Authority dated Mar. 3, 2015 corresponding to International Patent Application No. PCT/US2014/067921, 10 pages.

International Search Report and Written Opinion of the International Searching Authority dated Apr. 15, 2015, corresponding to International Patent Application No. PCT/2014/067994, 13 pages.

Bouchenak, S., "Architecture-Based Autonomous Repair Management: An Application to J2EE Clusters", Proceedings of the 24th IEEE Symposium on Reliable Distributed Systems [online], 2005 [retrieved Dec. 16, 2015], Retrieved from Internet: <URL: http://ieeexplore.ieee.org/stamp/stamp.jsp?tp=&arnumber=1541181>, pp. 1-12.

Wang, et al., "Automatic Online News Issue Construction in Web Environment, "WWW 2008/Refereed Track: Search—Applications, Apr. 21-25, 2008—Beijing, China, pp. 457-466.

(56) References Cited

OTHER PUBLICATIONS

Blei et al., "Latent Dirichlet Allocation" Journal of Machine Learning Research 3 (2003), pp. 993-1022.
Chuang et al., "A Practical Web-based Approach to Generating Topic Hierarchy for Text Segments," CIKM '04, Nov. 8-13, 2004, Washington, DC, USA, Copyright 2004 ACM 1-58113-874-0/04/0011, pp. 127-136.
Vizard, The Rise of In-Memory Databases, Jul. 13, 2012.
Canadian Office Action dated Apr. 26, 2017 in Canadian Application No. 2,932,403, 3 pages.

\* cited by examiner

METHOD FOR FACET SEARCHING AND SEARCH SUGGESTIONS

CROSS-REFERENCE TO RELATED APPLICATIONS

This application is a continuation of U.S. patent application Ser. No. 14/557,807, entitled "Method for Facet searching and search suggestions," filed on Dec. 2, 2014, which is a non-provisional patent application that claims the benefit of U.S. Provisional Application No. 61/910,834, entitled "Method for Facet Searching and Search Suggestions," filed Dec. 2, 2013, which is incorporated by reference in its entirety.

This application is related to U.S. patent application Ser. No. 14/557,906, entitled "Method for Disambiguating Features in Unstructured Text," filed Dec. 2, 2014; U.S. patent application Ser. No. 14/558,300, entitled "Event Detection Through Text Analysis Using Trained Event Template Models," filed Dec. 2, 2014; U.S. patent application Ser. No. 14/558,254, entitled "Design and Implementation of Clustered In-Memory Database," filed Dec. 2, 2014; U.S. patent application Ser. No. 14/557,827, entitled "Real-Time Distributed In Memory Search Architecture," filed Dec. 2, 2014; U.S. patent application Ser. No. 14/557,951, entitled "Fault Tolerant Architecture for Distributed Computing Systems," filed Dec. 2, 2014; U.S. patent application Ser. No. 14/558,009, entitled "Dependency Manager for Databases," filed Dec. 2, 2014; U.S. patent application Ser. No. 14/558,055, entitled "Pluggable Architecture for Embedding Analytics in Clustered In-Memory Databases," filed Dec. 2, 2014; U.S. patent application Ser. No. 14/558,101 "Non-Exclusionary Search Within In-Memory Databases," filed Dec. 2, 2014; and U.S. patent application Ser. No. 14/557,900, entitled "Data record compression with progressive and/or selective decompression," filed Dec. 2, 2014; each of which are incorporated herein by reference in their entirety.

TECHNICAL FIELD

The present disclosure relates in general to in-memory databases, and more specifically to faceted searching and search suggestions within in-memory databases.

BACKGROUND

Faceted searching provides users with an incremental search and browse experience that lets them begin with a keyword search and go through the search results in an organized and simple way. Faceted searching, in many occasions, is used to serve up maps of the search results that may provide useful insights into the organization and content of these search results. Faceted navigation also allows users to systematically narrow down the search results in a fairly simple manner. Due to its many advantages, faceted search and navigation is being deployed rapidly across a wide variety of contexts and platforms. Unfortunately, the way facet engines work is too slow and very memory intensive, which prevent these types of search engines from performing better and scaling.

Therefore, there is still a need of accurate, fast and scalable faceted search engines.

SUMMARY

Methods for faceted searching within clustered in-memory databases are disclosed. In some embodiments, the disclosed faceted searching methods and search engine may be used to generate search suggestions. The faceted search engine may be able to use literal or non-literal key construction algorithms for partial prefix fuzzy matching. The disclosed search engine may be capable of processing large amounts of unstructured data in real time to generate search suggestions. The system architecture of an in-memory database that may support the disclosed faceted search engine may include any suitable combination of modules and clusters; including one or more of a system interface, a search manager, an analytics agent, a search conductor, a partitioner, a collection, a supervisor, a dependency manager, or any suitable combination. In some embodiments, when a user starts typing in a suitable search window, the system may automatically generate one or more suggestions which may be derived from the fuzzy matches of the words that are being typed be the user on the search box. The system may score a query against the one or more records, where the system may score the match of one or more fields of the records and may then determine a score for the overall match of the records to the query. The system may determine whether the score is above a predefined acceptance threshold, where the threshold may be defined in the search query or may be a default value.

During processing, facets with different levels of specificity may be extracted from documents, disambiguated, normalized, grouped by topic and indexed and added temporarily to a knowledge base. In some embodiments, the extracted facets may be use to map search results. In further embodiments, fuzzy matching algorithms may compare facets temporarily stored in collections with the one or more queries being generated by the system and drop down windows, which may include the most relevant level one facets, may serve search suggestions to users; the users may be allowed to select facets of different levels to narrow down search queries.

In one embodiment, a computer-implemented method comprises extracting, by a computer, one or more facets from a corpus comprising data representing text-based information; disambiguating, by the computer, each of the one or more facets extracted from the corpus; generating, by the computer, one or more indices associated with the one or more facets respectively; retrieving, by the computer, each of the facets based on the associated index from a record of partition comprising one or more records of a database, wherein a collection of the database comprises one or more partitions, and wherein each respective facet indicates a hierarchical relation of data stored in the database relative to the one or more records of data; and generating, by the computer, a suggested search query based on each of the facets.

Numerous other aspects, features and benefits of the present disclosure may be made apparent from the following detailed description taken together with the drawing figures.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

Figure 1:
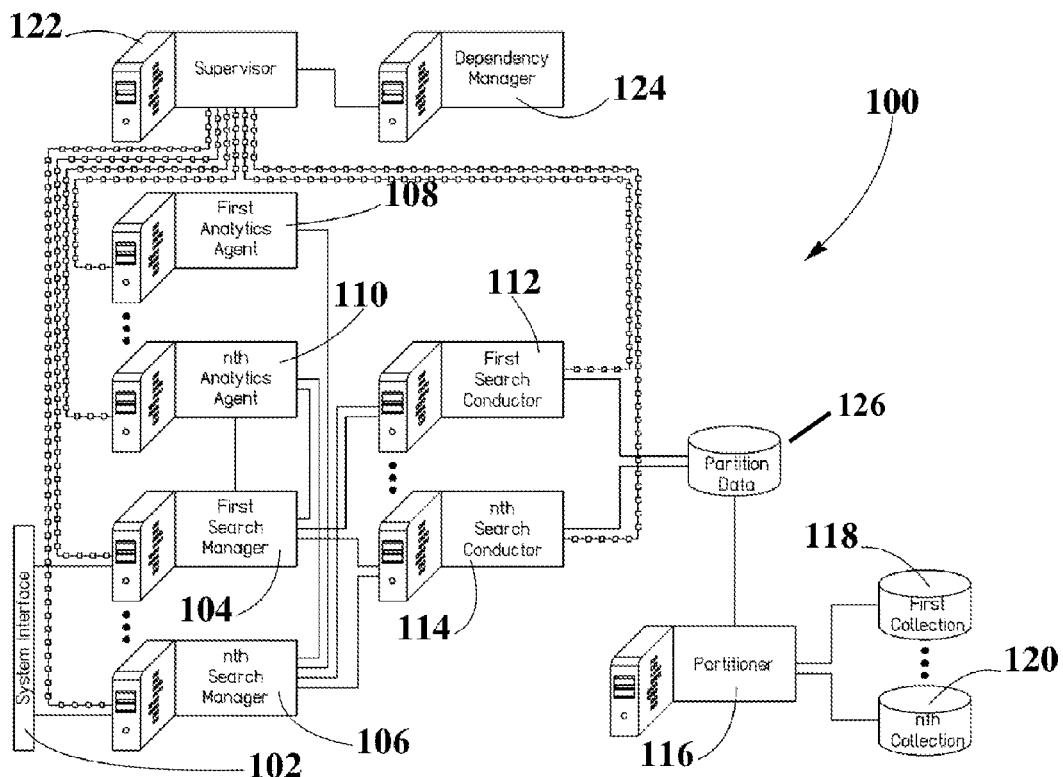
FIG. 1 shows an in-memory database architecture, according to an embodiment.

The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

DEFINITIONS

As used herein, the following terms may have the following definitions:

"Database" refers to any system including any combination of clusters and modules suitable for storing one or more collections and suitable to process one or more queries.

"Query" refers to a request to retrieve information from one or more suitable databases.

"Memory" refers to any hardware component suitable for storing information and retrieving said information at a sufficiently high speed.

"Node" refers to a computer hardware configuration suitable for running one or more modules.

"Cluster" refers to a set of one or more nodes.

"Module" refers to a computer software component suitable for carrying out one or more defined tasks.

"Collection" refers to a discrete set of records.

"Record" refers to one or more pieces of information that may be handled as a unit.

"Partition" refers to an arbitrarily delimited portion of records of a collection.

"Search Manager", or "S.M.", refers to a module configured to at least receive one or more queries and return one or more search results.

"Analytics Agent", "Analytics Module", "A.A.", or "A.M.", refers to a module configured to at least receive one or more records, process said one or more records, and return the resulting one or more processed records.

"Search Conductor", or "S.C.", refers to a module configured to at least run one or more search queries on a partition and return the search results to one or more search managers.

"Node Manager", or "N.M.", refers to a module configured to at least perform one or more commands on a node and communicate with one or more supervisors.

"Supervisor" refers to a module configured to at least communicate with one or more components of a system and determine one or more statuses.

"Heartbeat", or "HB", refers to a signal communicating at least one or more statuses to one or more supervisors.

"Partitioner" refers to a module configured to at least divide one or more collections into one or more partitions.

"Dependency Manager", or "D.M.", refers to a module configured to at least include one or more dependency trees associated with one or more modules, partitions, or suitable combinations, in a system; to at least receive a request for information relating to any one or more suitable portions of said one or more dependency trees; and to at least return one or more configurations derived from said portions.

"Document" refers to a discrete electronic representation of information having a start and end.

"Corpus" refers to a collection of one or more documents.

"Live corpus" refers to a corpus that is constantly fed as new documents are uploaded into a network.

"Feature" refers to any information which is at least partially derived from a document.

"Feature attribute" refers to metadata associated with a feature; for example, location of a feature in a document, confidence score, among others.

"Fact" refers to objective relationships between features.

"Knowledge base" refers to a base containing disambiguated features or facets.

"Link on-the-fly module" refers to any linking module that performs data linkage as data is requested from the system rather than as data is added to the system.

"Sentiment" refers to subjective assessments associated with a document, part of a document, or feature.

"Topic" refers to a set of thematic information which is at least partially derived from a corpus.

"Prefix" refers to a string of length p which comprises of the longest string of key characters shared by all sub-trees of the node and a data record field for storing a reference to a data record "Facet" refers to clearly defined, mutually exclusive, and collectively exhaustive aspects, properties or characteristics of a class, specific subject, topic or feature.

DETAILED DESCRIPTION

The present disclosure describes methods for faceted searching within clustered in-memory databases. Where faceted searching may be used to generate search suggestions. Systems and methods described herein may provide process and routines for generating facets and determining corresponding frequency counts as a function integrated with various other functions of a search process querying an in-memory database. Embodiments of such systems and methods provide the ability to generate these facets in a computationally efficient manner by running (i.e., traversing) the facts as an integral part of the query in an in-memory database. Embodiments may also provide techniques and processes of implementing facets generate search suggestions on the fly, thereby allowing the embodiments of the system to leverage the computationally efficient facet generation for generating search suggestions, based on the actual facets generated from a large corpus of documents, and then incrementally refining them as the search is being entered by a user.

An in-memory database is a database storing data in records controlled by a database management system (DBMS) configured to store data records in a device's main memory, as opposed to conventional databases and DBMS modules that store data in "disk" memory. Conventional disk storage requires processors (CPUs) to execute read and write commands to a device's hard disk, thus requiring CPUs to execute instructions to locate (i.e., seek) and retrieve the memory location for the data, before performing some type of operation with the data at that memory location. In-memory database systems access data that is placed into main memory, and then addressed accordingly, thereby mitigating the number of instructions performed by the CPUs and eliminating the seek time associated with CPUs seeking data on hard disk.

In-memory databases may be implemented in a distributed computing architecture, which may be a computing system comprising one or more nodes configured to aggregate the nodes' respective resources (e.g., memory, disks, processors). As disclosed herein, embodiments of a computing system hosting an in-memory database may distribute and store data records of the database among one or more nodes. In some embodiments, these nodes are formed into "clusters" of nodes. In some embodiments, these clusters of nodes store portions, or "collections," of database information.

FIG. 1 shows in-memory database 100 system architecture, according to an embodiment. MEMDB 100 system architecture may include system Interface 102, first search manager 104, nth search manager 106, first analytics agent 108, nth analytics agent 110, first search conductor 112, nth search conductor 114, partitioner 116, first collection 118, nth collection 120, supervisor 122, and dependency manager 124.

In one or more embodiments, system interface 102 may be configured to feed one or more queries generated outside of the system architecture of MEMDB 100 to one or more search managers in a first cluster including at least a first search manager 104 and up to nth search manager 106. Said one or more search managers in said first cluster may be linked to one or more analytics agents in a second cluster including at least a first analytics agent 108 and up to nth analytics agent 110.

Search managers in said first cluster may be linked to one or more search conductors in a third cluster including at least a first search conductor 112 and up to nth search conductor 114. Search conductors in said third cluster may be linked to one or more partitions 126, where partitions corresponding to at least a First Collection 118 and up to nth Collection 120 may be stored at one or more moments in time.

One or more nodes, modules, or suitable combination thereof included in the clusters included in MEMDB 100 may be linked to one or more supervisors 122, where said one or more nodes, modules, or suitable combinations in said clusters may be configured to send at least one heartbeat to one or more supervisors 122. Supervisor 122 may be linked to one or more dependency managers 124, where said one or more dependency managers 124 may include one or more dependency trees for one or more modules, partitions, or suitable combinations thereof. Supervisor 122 may additionally be linked to one or more other supervisors 122, where additional supervisors 122 may be linked to said clusters included in the system architecture of MEMDB 100.

Figure 2:
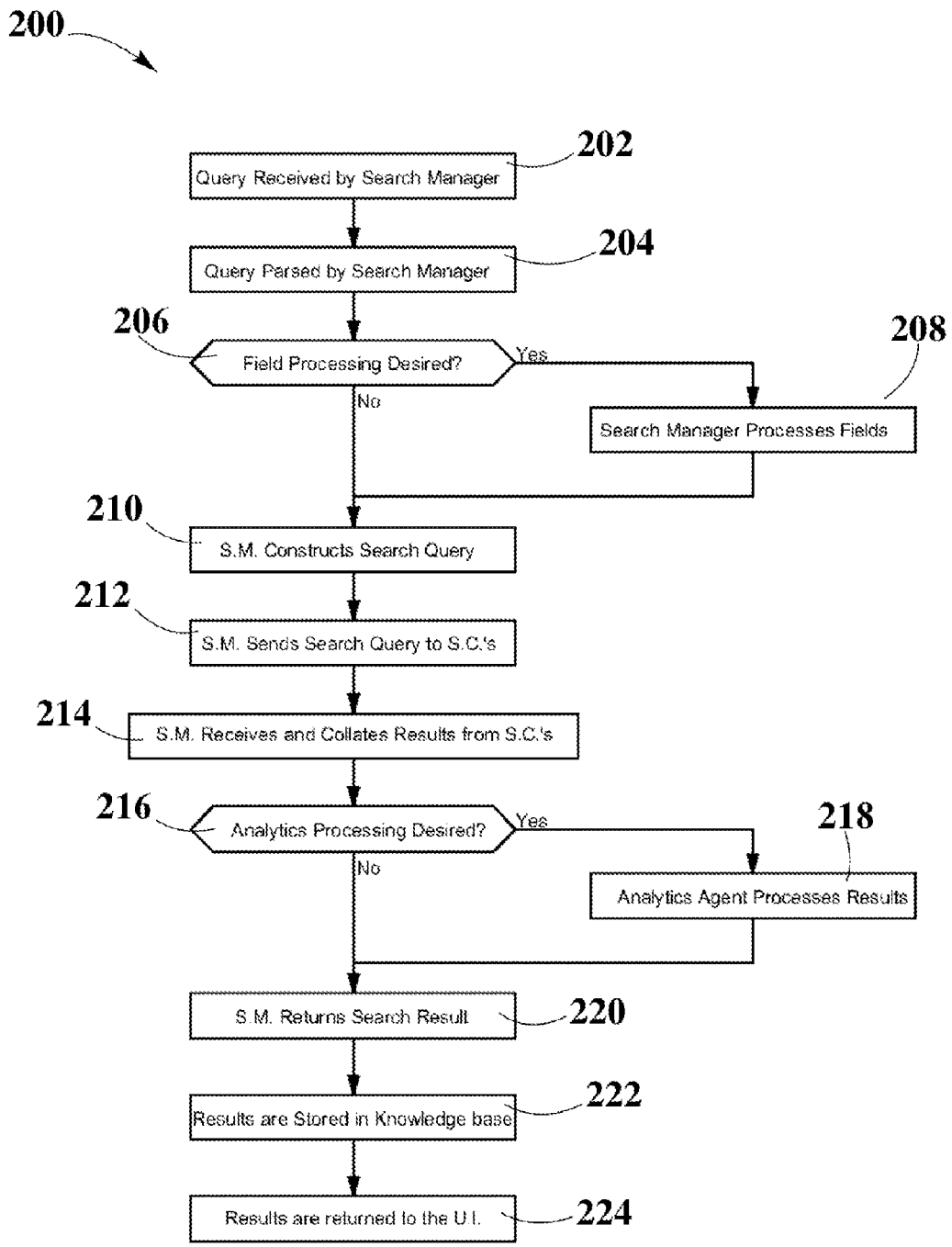
FIG. 2 is a flow chart describing a method for faceted searching, according to an embodiment.

FIG. 2 is a flow chart describing a method for faceted searching 200, according to an embodiment. Separating or grouping documents using facets may effectively narrow down search results. When performing a faceted search, each facet may be considered a dimension of a document in a multidimensional space and by selecting specific document facets the possibilities of finding relevant search results may be significantly improved while the time required to perform a search may be substantially shortened.

The process may start with query received by search manager 202, in which one or more queries generated by an external source may be received by one or more search managers. In some embodiments, these queries may be automatically generated by a system interface 102 as a response to an interaction with a user. In one or more embodiments, the queries may be represented in a markup language, including XML and HTML. In one or more other embodiments, the queries may be represented in a structure, including embodiments where the queries are represented in JSON. In some embodiments, a query may be represented in compact or binary format.

Afterwards, the received queries may be parsed by search managers 204. This process may allow the system to determine if field processing is desired 206. In one or more embodiments, the system may be capable of determining if the process is required using information included in the query. In one or more other embodiments, the one or more search managers may automatically determine which one or more fields may undergo a desired processing.

If the system determined that field processing for the one or more fields is desired, the one or more search managers may apply one or more suitable processing techniques to the one or more desired fields, during search manager processes fields 208. In one or more embodiments, suitable processing techniques may include address standardization, proximity boundaries, and nickname interpretation, amongst others. In some embodiments, suitable processing techniques may include the extraction of prefixes from strings and the generation of non-literal keys that may later be employed to perform fuzzy matching techniques.

Then, when S.M. constructs search query 210, one or more search managers may construct one or more search queries associated with the one or more queries. In one or more embodiments, the search queries may be constructed so as to be processed as a stack-based search.

Subsequently, S.M. may send search query to S.C. 212. In some embodiments, one or more search managers may send the one or more search queries to one or more search conductors, where said one or more search conductors may be associated with collections specified in the one or more search queries.

The one or more search conductors may score records against the one or more queries, where the search conductors may score the match of one or more fields of the records and may then determine a score for the overall match of the records. The system may determine whether the score is above a predefined acceptance threshold, where the threshold may be defined in the search query or may be a default value. In one or more embodiments, the default score thresholds may vary according to the one or more fields being scored. If the search conductor determines in that the scores are above the desired threshold, the records may be added to a results list. The search conductor may continue to score records until it determines that a record is the last in the partition. If the search conductor determines that the last record in a partition has been processed, the search conductor may then sort the resulting results list. The search conductor may then return the results list to a search manager.

When S.M. receives and collates results from S.C.'s 214, the one or more search conductors return the one or more search results to the one or more search managers; where, in one or more embodiments, said one or more search results may be returned asynchronously. The one or more search managers may then compile results from the one or more search conductors into one or more results list.

The system may determine whether analytics processing 216 of the search results compiled by the one or more search managers is desired. In one or more embodiments, the system determines if the processing is desired using information included in the query. In one or more other embodiments, the one or more search managers may automatically determine which one or more fields may undergo a desired processing.

If the system determines that aggregate analytics processing is desired, one or more analytics agents may process results 218, through the application of one or more suitable processing techniques to the one or more results list. In one or more embodiments, suitable techniques may include rolling up several records into a more complete record, performing one or more analytics on the results, and determining information about neighboring records, amongst others. In some embodiments, analytics agents may include disambiguation modules, linking modules, link on-the-fly modules, or any other suitable modules and algorithms. During processing, facets with different levels of specificity may be extracted from documents, disambiguated, normalized, group by topics and indexed. The facets may be indexed according to a hierarchy, where the hierarchy may be predefined or defined by the system on the fly. In one or more embodiments, level 1 facets may be broadest facets and subsequent levels may be derived with descending relevance or higher degree of specificity.

The facets from the results list may be stored in collections. In some embodiments, each facet type may be stored in a different collection or group of collections.

After processing, according to some embodiments, the one or more analytics agents may return one or more processed results lists to the one or more search managers.

A search manager may return search results 220. In some embodiments, the one or more search managers may decompress the one or more results list and return them to the system that initiated the query.

Optionally, according to some embodiments, the search results may be temporarily stored in a knowledge base 222 and returned to a user interface 224. The knowledge base may be used to temporarily store clusters of relevant disambiguated facets and their related features. When new documents may be loaded into the MEMDB, the new disambiguated set of facets may be compared with the existing knowledge base in order to determine the relationship between facets and determine if there is a match between the new facets and previously extracted facets. If the facets compared match, the knowledge base may be updated and the ID of the matching facets may be returned. If the facets compared do not match with any of the already extracted facets, a unique ID is assigned to the disambiguated entity or facet, and the ID is associated with the cluster of defining features and stored in within the knowledge base of the MEMDB.

Figure 3:
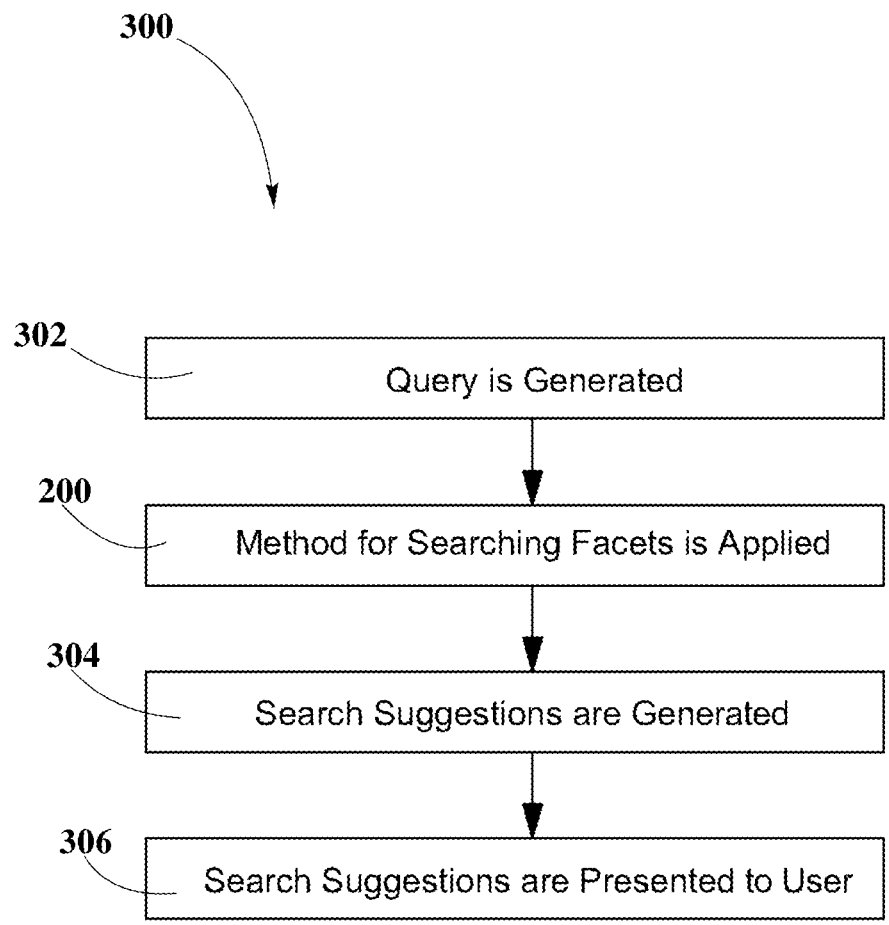
FIG. 3 is a flow chart of a method for generating search suggestions using faceted searching, according to an embodiment.

FIG. 3 is a flow chart of method for generating search suggestions 300 using faceted searching, according to an embodiment. Method for generating search suggestions 300 may begin with query generation 302. In some embodiments, when a user starts typing on a suitable search window, the system may automatically generate queries which may be derived from the prefixes of the words that are being typed be the user on the search box. These queries may be generated even with a minimum number of characters typed in the search window (3 or 4) and before the user has finished typing a string on the search window.

Once a suitable query is generated, method for faceted searching 200 may be applied. The application of this method may include the use of literal or non-literal key algorithms that may allow matching of partial prefixes.

To generate search suggestions 304, fuzzy matching algorithms may compare facets temporarily stored in collections with the one or more queries being generated by the system. In this manner, counts of hits with respect to the current one or more queries may be assigned to the facets of different hierarchy levels that may be in different partitions of the collections. Then, level 1 facets, may be assigned a cumulative count of hits and sorted according to the total number of hits.

Afterwards, search suggestions may be presented to user 306. In some embodiments, this may be done in the form of a drop down window, which may include the most relevant level one facets, each one with its associated number of hits and the user may be allowed to select facets of different levels to narrow down search queries or to start new queries. According to some embodiments, this process may be able to generate and serve faceted search suggestions before a user has finished typing a string on a search window, as characters in a search window start to develop words this process may happen several times.

In example #1, the disclosed method for faceted searching is applied. The MEMDB analyses documents from a large corpus, extracts facets, disambiguates and indexes the extracted facets and the stores them in different partitions of more than two collections according to the facet type and hierarchy. In example #1, a user types the word "united" in a search box and the system returns the search results by facets. Level one facets include "Class", "Location", "Product", "Technology" and "Company", amongst others. The number of hits for each level 2 facet is shown and the user is able to narrow down the search at least 3 more levels.

In example #2, the disclosed method for faceted searching is applied. The MEMDB analyses documents from a large corpus, extracts facets, disambiguates and indexes the extracted facets and the stores them in different partitions of more than two collections according to the facet type and hierarchy. In example #2, a user types the characters "ply" in a search box and the system automatically generates search suggestions by facets. Level one facets include "Class", "Location", "Product", "Technology" and "Company", amongst others. The number of hits for each level 2 facet is shown and the user is able to narrow down the search at least 3 more levels.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A computer-implemented method comprising:
   extracting, by a computer of an in-memory database system, one or more facets from a corpus comprising data of one or more types of data and containing information, the in-memory database comprising one or more computing devices comprising non-transitory machine-readable storage media configured to host an in-memory database;
   disambiguating, by the computer, each of the one or more facets extracted from the corpus;
   generating, by the computer, one or more indices associated with the one or more facets respectively; and
   responsive to the computer receiving a search query from a client computer:
      processing, by the computer, fields in the search query, wherein the processing comprises at least one of address standardization, proximity boundaries, nickname interpretation, extraction of at least prefix, and generation of at least one non-literal key;
      constructing, by the computer, a second search query associated with the search query;
      scoring, by the computer, a match of one or more records against the second search query;
      adding, by the computer, the one or more records to a results list based on the scoring;
      retrieving, by the computer, each of the facets based on the associated index from a record of a partition comprising the one or more records of the results list of the in-memory database, wherein a collection of the in-memory database comprises one or more partitions, and wherein each respective facet indicates a hierarchical relation of data stored in the database relative to the one or more records of data, and wherein the computer receives the record of a respective facet from a second computer configured to search the one or more records of the partition storing the respective facet; and
      generating, by the computer, a suggested search query based on each of the facets.

2. The method according to claim 1, wherein the computer comprises a processor executing a search manager node module.

3. The method according to claim 1, wherein the second computer comprises a processor executing a search conductor module.

4. The method according to claim 1, wherein the computer comprises a process executing an analytics agent module.

5. The method according to claim 1, wherein generating the indices associated with the one or more facets further comprises storing, by the computer, the indices into the knowledgebase.

6. The method according to claim 1, wherein the indices may be generated for each respective facet according to a hierarchical relation of facets, the hierarchical relation indicating a level of specificity for the respective facet being indexed.

7. The method according to claim 6, wherein generating the indices associated with one or more facets further comprises, for each respective facet, determining, by the computer, the level of specificity of the respective facet upon disambiguating the respective facet.

8. The method according to claim 1, further comprising storing, by the computer, each respective facet into one or more collections hosted in the one or more partitions of the in-memory database.

9. The method according to claim 1, wherein, upon disambiguating the one or more facets extracted from the corpus, the method further comprises: storing, by the computer, each facet into a knowledgebase hosted on the in-memory database, the knowledgebase hosted on one or more server computers comprising non-transitory machine-readable storage memory configured to store one or more records containing at least one facet of the one or more facets.

10. The method according to claim 9, further comprising determining, by the computer, the one or more new facets match the one or more facets stored in the knowledgebase.

11. The method according to claim 1, further comprising:
   receiving, by the computer, a new document for inclusion into the corpus; and extracting, by the computer, one or more new facets from the new document upon receiving the new document.

12. The method according to claim 11, further comprising storing, by the computer, a new facet into the knowledgebase upon determining the new facet is not matched to at least one facet in the knowledgebase.

13. The method according to claim 11, wherein, upon determining a new facet matches at least one facet in the knowledgebase, the method further comprises: updating, by the computer, the record of the at least one facet to include the new facet.

14. The method according to claim 13, further comprising deriving, by the computer, the derived search query based upon one or more prefixes of one or more words included in the search query received from the client computer.

15. The method according to claim 13, wherein the search query is updated upon receiving typed inputs from the client computer, and wherein the derived search query is updated based upon each word included into the search query.

16. The method according to claim 1, further comprising generating, by the computer, a derived search query based upon the search query inputted from the client computer.

\* \* \* \* \*